(12) United States Patent
Fladhammer

(10) Patent No.: US 7,762,686 B2
(45) Date of Patent: Jul. 27, 2010

(54) LAMP ADJUSTER

(75) Inventor: Scott Fladhammer, Racine, WI (US)

(73) Assignee: Asyst Technologies, LLC, Kenosha, WI (US)

( * ) Notice: Subject to any disclaimer, the term of this patent is extended or adjusted under 35 U.S.C. 154(b) by 4 days.

(21) Appl. No.: 11/624,540

(22) Filed: Jan. 18, 2007

(65) Prior Publication Data

US 2008/0175014 A1     Jul. 24, 2008

(51) Int. Cl.
*F21V 21/26* (2006.01)

(52) U.S. Cl. .................. 362/273; 362/289; 362/423; 362/424; 362/515; 362/524; 74/89.23

(58) Field of Classification Search .......... 362/273, 362/289, 423, 424, 515, 524, 528; 74/89.23
See application file for complete search history.

(56) References Cited

U.S. PATENT DOCUMENTS

| | | | |
|---|---|---|---|
| 5,309,780 A * | 5/1994 | Schmitt | 362/524 |
| 5,381,317 A * | 1/1995 | Schmitt et al. | 362/515 |
| 6,257,747 B1 | 7/2001 | Burton | |
| 6,474,850 B1 | 11/2002 | Burton | |
| 6,913,374 B2 | 7/2005 | Burton | |
| 6,918,687 B2 * | 7/2005 | Deguchi | 362/524 |
| 2003/0043591 A1 | 3/2003 | Burton | |
| 2005/0145050 A1 | 7/2005 | Fladhammer | |

FOREIGN PATENT DOCUMENTS

| | | |
|---|---|---|
| DE | 3836094 A1 | 4/1990 |
| DE | 10345336 A1 | 4/2005 |
| EP | 0384838 | 9/1992 |

OTHER PUBLICATIONS

European Search Report Dated Mar. 5, 2009.

* cited by examiner

*Primary Examiner*—Stephen F Husar
(74) *Attorney, Agent, or Firm*—Jennifer R. Racine; Godfrey & Kahn, S.C.

(57) ABSTRACT

A lamp adjuster for adjusting the aim of a headlamp. The adjuster includes a housing having a first adjustment point, a gear having a second adjustment point, and an output shaft disposed at least partially within and functionally engaging the gear. Movement of the output shaft can be effected using either the first adjustment point or the second adjustment point. The adjuster can also include a clutching feature.

17 Claims, 3 Drawing Sheets

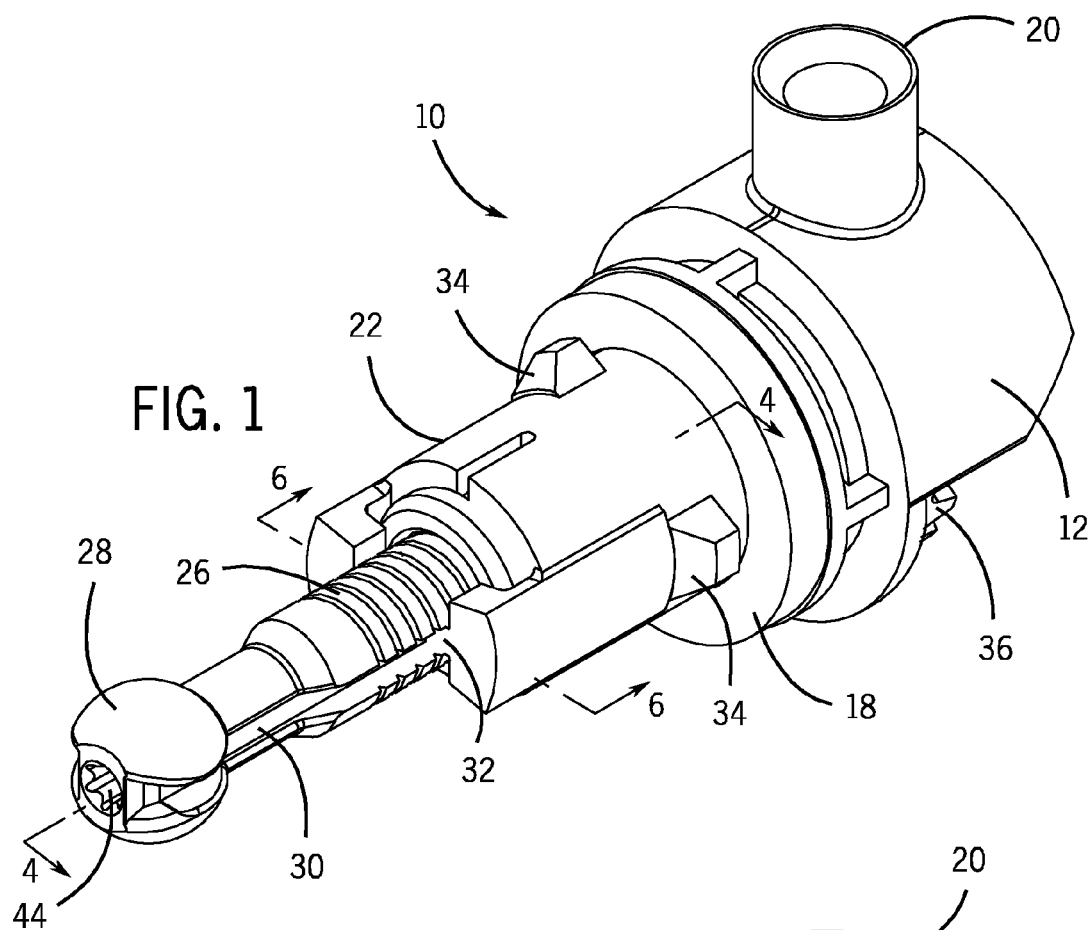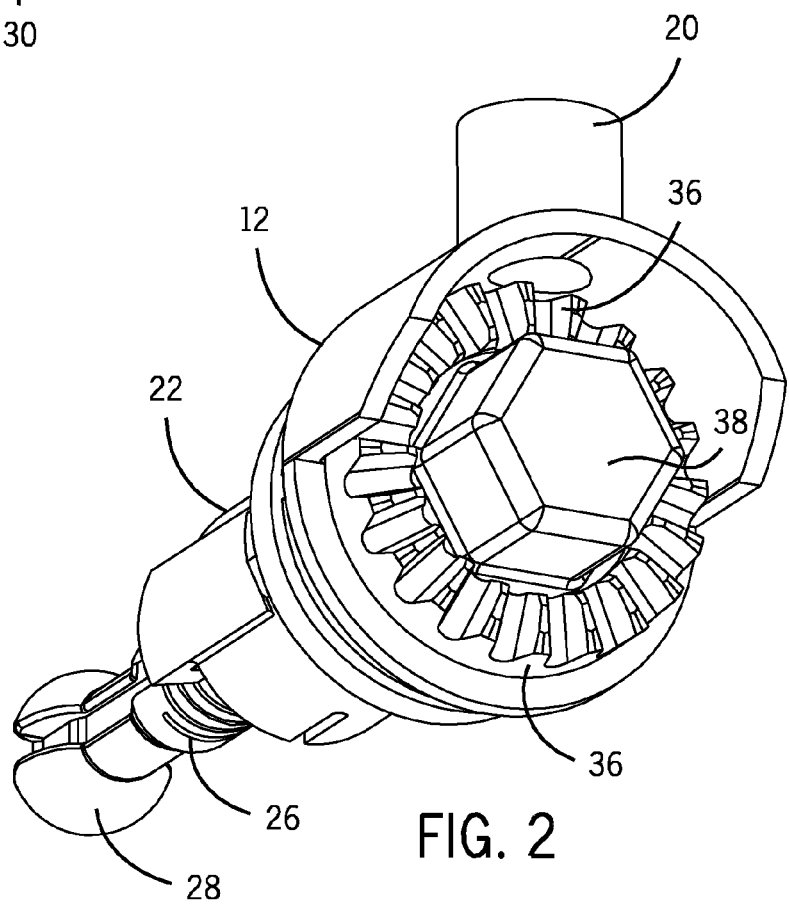

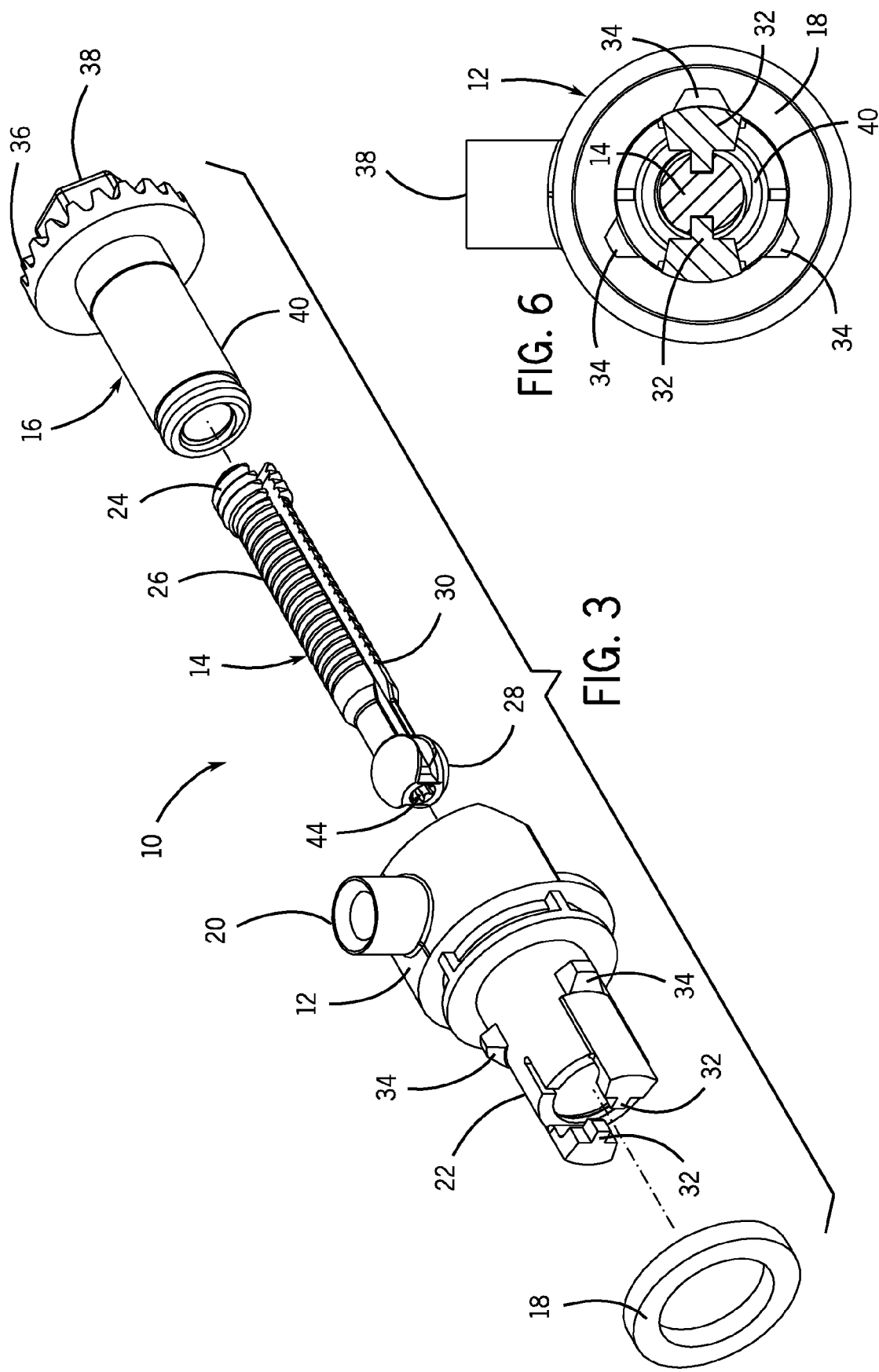

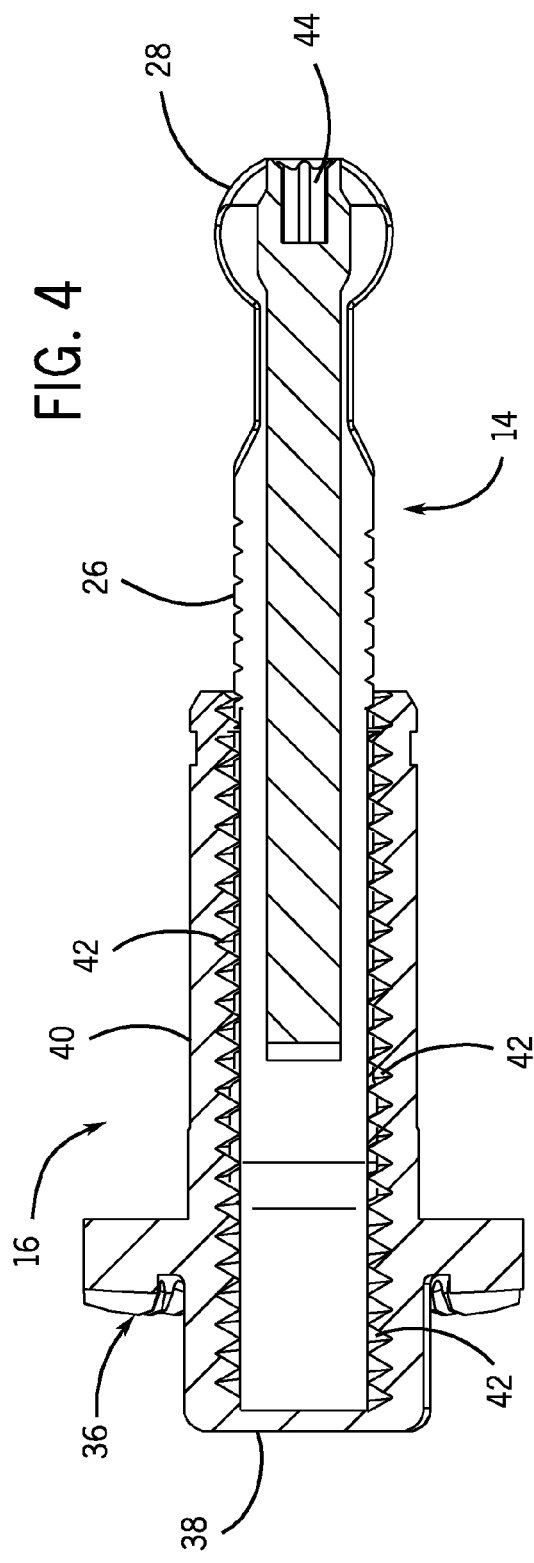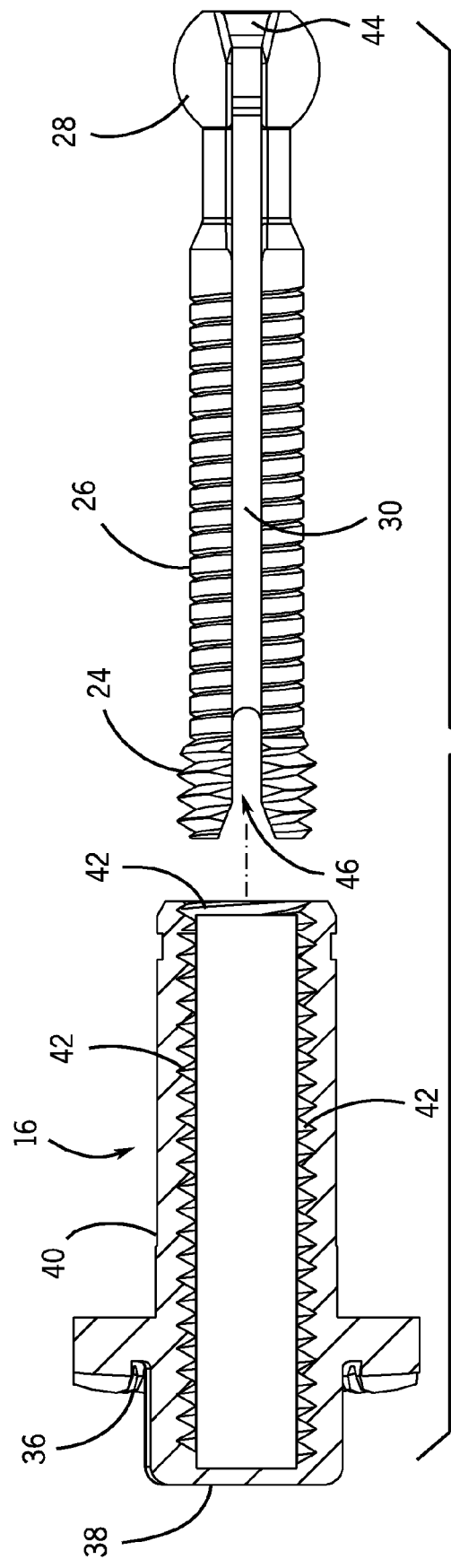

LAMP ADJUSTER

BACKGROUND OF THE INVENTION

The present invention relates generally to adjusters that are used to adjust the aim of a vehicle lamp. Specifically, this invention relates to a vehicle lamp adjuster that can be adjusted from more than one location and can include a clutching mechanism.

Vehicles such as automobiles typically have several lamps including head lamps and fog lamps. These lamps generally include a housing supporting a reflector and a lens with a bulb mounted therebetween, and are often securely fit into mounting brackets attached to the vehicle. Together, a lamp and a mounting bracket form a complete lamp assembly. Once the lamp assembly has been manufactured and installed into a vehicle, the lamp must be adjusted to the proper aim. As a result of accidents, maintenance, and normal vibrations and wear, the aim of the lamp must be occasionally adjusted during the lifetime of the vehicle as well.

One method of adjusting the aim of the lamp involves using an adjuster. The adjuster may be formed as part of the mounting bracket or may be a separate part that communicates with both the lamp and the mounting bracket. One known type of adjuster comprises a housing and an output shaft extending therefrom. The output shaft is engaged to the lamp. Actuation or operation of the adjuster causes the output shaft to move with respect to the lamp assembly. Such movement causes the lamp to pivot or otherwise move with respect to the mounting bracket, thereby adjusting the aim of the lamp.

One example of this type of adjuster, disclosed in U.S. Pat. No. 6,257,747 to Burton, requires manual operation. The housing of the adjuster has an opening and a gear positioned inside the housing. The gear is functionally engaged to the output shaft. An input shaft is inserted into the opening and interacts with the gear. Actuation of the input shaft results in rotation of the gear and engaged output shaft. The gear translates actuation of the input shaft into movement of the output shaft. Numerous variations and improvements exist on this concept.

Due to the range of lamp assemblies and vehicles, adjusters that can be used in connection with several different lamp assemblies and vehicles are desirable. Most currently available adjusters have a single accessible adjustment point, namely, the input shaft. A range of input shaft configurations are currently available, for example, the Burton '747 patent referenced above discloses an adjuster having an input shaft disposed perpendicular to the output shaft and U.S. Pat. Nos. 6,474,850 and 6,913,374, both to Burton, disclose an adjuster having an input shaft disposed parallel to the output shaft. While the Burton designs are very effective for many applications, they all provide a single adjustment point and require the use of a different adjuster if a different adjustment point location is required for a particular application. As well, they do not provide the flexibility or convenience that would accompany a single adjuster capable of being adjusted at multiple points.

Accordingly, a need exists for an improved lamp adjuster that solves these and other deficiencies in the prior art. Of course, the present invention may be used in a multitude of situations where similar performance capabilities are required.

SUMMARY OF THE INVENTION

The present invention provides a lamp adjuster that is cost-effective, provides improved functionality, and which solves certain of the problems raised or not solved by existing designs. The adjuster of the present invention includes a housing having a first adjustment point, a gear having a second adjustment point and an extended cylindrical portion, an output shaft disposed at least partially within and functionally engaging the extended cylindrical portion and having a ball stud disposed at one end thereof Movement of the output shaft can be effected using either the first adjustment point or the second adjustment point.

The adjuster may further include a clutching feature. The clutching feature includes a first threaded portion and a second threaded portion on the output shaft, wherein the first threaded portion has a major diameter greater than that of the second threaded portion, and has a clutching slot disposed thereon. The first threaded portion of the output shaft and the extended cylindrical portion of the gear are in full thread-to-thread engagement and the second threaded portion and the extended cylindrical portion are in minimal engagement. The clutching slot allows the first threaded portion to flex inward and disengage from the extended cylindrical portion in response to excessive resistance to linear movement at any point along the travel path of the output shaft. The minimal engagement between the second threaded portion and the extended cylindrical portion, as opposed to no engagement, supports the output shaft in the extended cylindrical portion to minimize side-to-side deflection of the output shaft.

The present invention also contemplates a lamp for a vehicle. The lamp of the present invention includes a lamp housing, a lens supported by the housing, a reflector supported by the housing, a bulb disposed between the lens and the reflector, and an adjuster functionally engaged to the reflector. The adjuster includes a housing, at least two adjustment points, a gear, and an output shaft having a first threaded portion and a second threaded portion, wherein the first threaded portion has a major diameter greater than that of the second threaded portion, and wherein the first threaded portion includes a clutching slot. If desired, the housing of the adjuster may be integrally formed as part of the lamp housing.

The adjuster and lamp assembly of the present invention have several advantages over existing adjusters and lamp assemblies. Most significantly, the adjuster can be adjusted from more than one adjustment point, and regardless of which adjustment point is used, the adjuster can include a clutching feature that allows the adjuster to clutch at any point along the travel path of the output shaft. The multiple adjustment points allow the adjuster to be used in a variety of applications, and the clutching feature protects against damage to the adjuster and lamp. Each of the adjustment points can mate with a conventional driver, making the use of the adjuster of the present invention even more flexible.

While one possible application of the present invention is in connection with a vehicle lamp, many other applications are possible and references to use in connection with a vehicle lamp should not be deemed to limit the uses of the present invention. The terms used herein should not be interpreted as being limited to specific forms, shapes, or compositions. Rather, the parts may have a wide variety of shapes and forms and may be composed of a wide variety of materials. These and other objects and advantages of the present invention will become apparent from the detailed description, claims, and accompanying drawings.

DESCRIPTION OF THE DRAWINGS

FIG. 1 is a front perspective view of an adjuster in accordance with the present invention;

FIG. 2 is a rear perspective view of the adjuster of FIG. 1;

FIG. 3 is an exploded perspective view of the adjuster of FIG. 1.

FIG. 4 is a cross-sectional view of the gear and output shaft of FIG. 1, taken along plane 4-4 of FIG. 1;

FIG. 5 is an exploded, partial cross-sectional view of the gear and output shaft of FIG. 4; and FIG. 6 is a cross-sectional view of the adjuster of FIG. 1, taken along plane 6-6 of FIG. 1.

DETAILED DESCRIPTION OF THE PREFERRED EMBODIMENTS

Referring now to the drawings, an adjuster 10 according to one embodiment of the present invention includes a housing 12, an output shaft 14, a gear 16, and a gasket 18. The housing 12 includes an input boss 20 and a nose 22 having a set of tangs 32 and a set of tabs 34. The output shaft 14 includes a first threaded portion 24 at one end thereof, a second threaded portion 26 adjacent the first threaded portion 24, a ball stud 28 having a recess 44 and disposed at the other end thereof, and a channel 30 that runs along the length of the output shaft 14. The second threaded portion 26 has a smaller major thread diameter than the first threaded portion 24, and the first threaded portion 24 has a clutching slot 46 formed therein, as is best shown in FIG. 5. The gear 16 has teeth 36, a head 38, and an extended cylindrical portion 40. As best shown in FIGS. 4 and 5, the extended cylindrical portion 40 has internal threads 42 along its length.

To assemble the adjuster 10 of the present invention, several methods could be used, however the following method has been found to be particularly effective. The gasket 18 is first placed around the nose 22 of the housing 12 and snapped past tabs 34, which secure the gasket 18 in place. The gasket 18 will serve as a seal between the adjuster 10 and the lamp assembly or mounting hardware in which it is installed. The output shaft 14 is then driven into the extended cylindrical portion 40 of the gear 16 to a desired pre-set position dictated by the lamp assembly and vehicle in which the adjuster 10 will be installed. The recess 44 in ball stud 28 of the output shaft 14 can be used to drive the output shaft 14. The recess 44 preferably accepts a TORX® head driver, but other driving tools could of course also be used, and the ball stud 28 could be driven without the assistance of a recess 44. The first threaded portion 24 of the output shaft 14 engages the threads 42 of the extended cylindrical portion 40 of the gear 16 as the output shaft 14 is driven into the gear 16. The first threaded portion 24 and the threads 42 are in a fully threaded, mating engagement, while the second threaded portion 26 and the threads 42 are in a limited mating engagement because the second threaded portion 26 has a smaller major diameter than the first threaded portion 24. To continue assembly of the adjuster 10, a second gasket (not shown) can be placed around the extended cylindrical portion 40 of the gear 16 to create a seal between the housing 12 and the gear 16. Then, the output shaft-gear 14-16 subassembly is pressed into housing 12 such that the ball stud 28 end of the output shaft 14 extends from the nose 22 of the housing 12 and the housing tangs 32 are disposed in the channel 30 of the output shaft 14. The adjuster 10 can then be installed in a lamp assembly (not shown) such that the ball stud 28 of the output shaft 14 functionally engages the lamp.

Once installed, the adjuster 10 can be used to adjust the lamp. An operator can choose between two different points of adjustment using the adjuster 10 of the present invention. A driver can be inserted into the input boss 20 on the top of the housing 12 to mate with the gear teeth 36. A driver with a Phillips #2 drive bit works well in this application, but other drivers could also be used. The gear teeth 36 can be designed to accommodate a number of different drivers as well. As the selected driver is turned, the gear 16 rotates. Because the output shaft 14 is in threaded engagement with the gear 16 but prevented from rotation by the tangs 32 disposed within channel 30, the rotation of the gear 16 causes the output shaft 14 to translate linearly. The linear translation of the output shaft 14 effects adjustment of the lamp. Alternatively, the driver or other input shaft could be permanently positioned within the housing 12. An operator can also use the head 38 of the gear 16 to effect adjustment. The head 38 is preferably hexagon-shaped to mate with a ½" hex socket, but other shapes and tools could also be used to turn the head 38. Turning the head 38 turns the gear 16, which, in the same manner described above, causes the output shaft 14 to translate linearly, thereby effecting adjustment of the lamp. Thus, the adjuster 10 of the present invention can be adjusted in two different ways, from two different adjustment points. In the embodiments shown, the adjustment points are oriented perpendicular to one another, which will allow the adjuster to be used in a wide range of applications, however, the adjustment points could be positioned at other locations and angles with respect to one another as well.

Using either adjustment method, the adjuster 10 includes a clutching feature to prevent damage to the adjuster as a result of over-adjustment, excessive torque application, or other resistance to the linear movement of the output shaft 14. The difference between the major thread diameters of the first threaded portion 24 and the second threaded portion 26 combined with the clutching slot 46 disposed within the first threaded portion 24 allow the output shaft 14 to clutch along the entire length of travel, regardless of which adjustment point is used. As previously described, the major thread diameter of the first threaded portion 24 is larger than that of the second threaded portion 26. The first threaded portion 24 spans a smaller section of the length of the output shaft 14 as well. For example, as shown in FIG. 5, the first threaded portion may contain only a few threads, while the second threaded portion may contain about twenty threads. One possible major thread diameter for the first threaded portion 24 is ⅜", and more specifically a ⅜-16 UNC Class 3A thread. Other numbers, diameters and types of threads for each portion 24, 26 could also be used as necessary for each application. It is also possible to use an unthreaded portion in place of the second threaded portion 26, however, a second threaded portion 26 is preferable, as described below, to support the output shaft 14 in the extended cylindrical portion 40 and prevent side-to-side deflection of the output shaft 14.

In operation, the first threaded portion 24 is in full thread-to-thread engagement with the threads 42, and the second threaded portion 26 is minimally engaged with threads 42 to provide adequate support between the second threaded portion 26 and the internal threads 42 to minimize side-to-side deflection of the output shaft 14. When the adjuster is over-adjusted, or subjected to excessive torque or force at any point along the output shaft 14, the slot 46 in the first threaded portion 24 allows the first threaded portion 24 to flex inward and disengage from the threads 42 and thereby prevent damage to the adjuster or lamp. Once the excessive torque or load is relieved, the first threaded portion 24 flexes back outward to reengage the threads 42. This engagement and disengagement can occur at any point as the output shaft 14 travels forward and backward in the extended cylindrical portion 40 of the gear 16. Thus, the adjuster 10 is protected not only from excessive torque or loads applied when the output shaft 14 is at either end of the travel path, but at any time an excessive torque or load is applied.

The housing 12, output shaft 14 and gear 16 can be manufactured from plastic materials, making them very lightweight and inexpensive to produce. Other materials could also be used, such as metal and composite materials, but lightweight and inexpensive materials are preferred. The gaskets can be manufactured from a number of different materials, including rubber and silicone materials.

The adjuster 10 of the present invention may have other applications aside from use in connection with vehicle lamp assemblies. Although the invention has been herein shown and described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims.

What is claimed is:

1. A lamp adjuster comprising:
   a housing having a first adjustment point;
   a gear having a second adjustment point and an extended cylindrical portion, the extended cylindrical portion disposed at least partially within the housing and having an at least partially threaded interior;
   an output shaft disposed at least partially within the housing, the output shaft having first and second threaded portions and a ball stud disposed at one end thereof;
   wherein the first threaded portion has a major thread diameter distinct from the major thread diameter of the second threaded portion, and the first and second threaded portions functionally engage the at least partially threaded interior of the extended cylindrical portion; and
   wherein movement of the output shaft can be effected using either the first adjustment point or the second adjustment point.

2. The lamp adjuster of claim 1, wherein the first adjustment point is an input boss for receiving a driver.

3. The lamp adjuster of claim 1, wherein the first adjustment point is an input shaft.

4. The lamp adjuster of claim 1, wherein the second adjustment point is a head of the gear shaped for engaging a driver.

5. The lamp adjuster of claim 1, wherein the first adjustment point and the second adjustment point are positioned perpendicular to one another.

6. The lamp adjuster of claim 1, further comprising a clutching slot in the output shaft at the first threaded portion thereof.

7. A lamp adjuster comprising:
   a housing having a first adjustment point;
   a gear having a second adjustment point and an extended cylindrical portion, the extended cylindrical portion disposed at least partially within the housing and having an at least partially threaded interior;
   an output shaft disposed at least partially within the housing, the output shaft having first and second threaded portions and a ball stud disposed at one end thereof;
   wherein the first threaded portion has a major thread diameter greater than that of the second threaded portion, and the first and second threaded portions functionally engage the at least partially threaded interior of the extended cylindrical portion; and
   wherein movement of the output shaft can be effected using either the first adjustment point or the second adjustment point.

8. A lamp adjuster comprising:
   a housing having a first adjustment point;
   a gear having a second adjustment point and an extended cylindrical portion, the extended cylindrical portion disposed at least partially within the housing and having an at least partially threaded interior;
   an output shaft disposed at least partially within the housing, the output shaft having first and second threaded portions functionally engaging the at least partially threaded interior of the extended cylindrical portion and having a ball stud disposed at one end thereof;
   wherein the first threaded portion of the output shaft is in flail thread-to-thread engagement with the at least partially threaded interior of the extended cylindrical portion and the second threaded portion of the output shaft is in minimal thread-to-thread engagement with the at least partially threaded interior of the extended cylindrical portion; and
   wherein movement of the output shaft can be effected using either the first adjustment point or the second adjustment point.

9. A lamp adjuster comprising:
   a housing having a first adjustment point;
   a gear having a second adjustment point and an extended cylindrical portion, the extended cylindrical portion disposed at least partially within the housing;
   an output shaft disposed at least partially within and functionally engaging the extended cylindrical portion and having a ball stud disposed at one end thereof;
   a first threaded portion and a second threaded portion on the output shaft, the first threaded portion having a major diameter greater than that of the second threaded portion and having a clutching slot disposed thereon; and
   wherein movement of the output shaft can be effected using either the first adjustment point of the second adjustment point.

10. The lamp adjuster of claim 9, wherein the first threaded portion and the extended cylindrical portion are in full thread-to-thread engagement and the second threaded portion and the extended cylindrical portion are in minimal thread-to-thread engagement.

11. The lamp adjuster of claim 9, wherein the housing includes an input boss for receiving a driver and the gear includes a head shaped to mate with a driver.

12. The lamp adjuster of claim 9, wherein the ball stud includes a recess for accepting a driver.

13. The lamp adjuster of claim 9, wherein the housing includes tangs that prevent the output shaft from rotating.

14. The lamp assembly of claim 9, wherein the clutching slot allows a portion of the output shaft to flex inwardly in response to excessive resistance to linear movement.

15. A lamp for a vehicle, the lamp comprising:
   a lamp housing;
   a lens supported by the housing;
   a reflector supported by the housing;
   a bulb disposed between the lens and the reflector; and
   an adjuster functionally engaged to the reflector, the adjuster including a housing having a first adjustment point a gear having a second adjust point and an extended cylindrical portion disposed at least partially within the housing and having an at least partially threaded interior, and an output shaft disposed at least partially within the housing and having a first threaded portion and a second threaded portion, wherein the first threaded portion has a major diameter greater than that of the second threaded portion, the first threaded portion includes a clutching slot, and wherein movement of the output shaft can be effected using either the first adjustment point or the second adjustment point.

16. The lamp of claim 15, wherein at least one of the adjustment points is oriented perpendicular to a longitudinal axis of the output shaft and at least one of the adjustment points is oriented parallel to the longitudinal axis.

17. The lamp of claim 15, wherein each of the adjustment points mate with conventional drivers.

* * * * *

UNITED STATES PATENT AND TRADEMARK OFFICE
CERTIFICATE OF CORRECTION

PATENT NO. : 7,762,686 B2  Page 1 of 1
APPLICATION NO. : 11/624540
DATED : July 27, 2010
INVENTOR(S) : Scott Fladhammer It is certified that error appears in the above-identified patent and that said Letters Patent is hereby corrected as shown below:

In the claims:
Column 6, Claim 8
Line 11, the word "flail" should be deleted and replace with the word --full--

Column 6, Claim 15
Line 57, the word "adjust" should be deleted and replaced with the word --adjustment--

Signed and Sealed this

Twenty-sixth Day of October, 2010

David J. Kappos
*Director of the United States Patent and Trademark Office*